US008244834B2

(12) United States Patent
Soelberg et al.

(10) Patent No.: US 8,244,834 B2
(45) Date of Patent: *Aug. 14, 2012

(54) SYSTEM, APPARATUS AND METHODS FOR STORING LINKS TO MEDIA FILES IN NETWORK STORAGE

(75) Inventors: Emily Lyons Soelberg, Atlanta, GA (US); Justin M. McNamara, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/768,863

(22) Filed: Apr. 28, 2010

(65) Prior Publication Data

US 2010/0211998 A1    Aug. 19, 2010

Related U.S. Application Data

(63) Continuation of application No. 11/127,385, filed on May 12, 2005, now Pat. No. 7,734,732.

(51) Int. Cl.
*G06F 15/16* (2006.01)
*G06F 15/173* (2006.01)

(52) U.S. Cl. .................. 709/219; 709/217; 709/226

(58) Field of Classification Search .................. 709/219, 709/223, 226, 203, 212, 217, 231
See application file for complete search history.

(56) References Cited

U.S. PATENT DOCUMENTS

| | | | |
|---|---|---|---|
| 666,231 A * | 1/1901 | Lawson | 70/20 |
| 5,924,070 A * | 7/1999 | Ittycheriah et al. | 704/275 |
| 6,662,231 B1 * | 12/2003 | Drosset et al. | 709/229 |
| 7,116,894 B1 * | 10/2006 | Chatterton | 386/211 |
| 7,116,984 B1 * | 10/2006 | Muhonen et al. | 455/456.1 |
| 7,502,606 B2 * | 3/2009 | Flynt et al. | 455/403 |
| 2002/0082054 A1 * | 6/2002 | Keinonen et al. | 455/567 |
| 2003/0005138 A1 * | 1/2003 | Giffin et al. | 709/231 |
| 2004/0220975 A1 * | 11/2004 | Carpentier et al. | 707/200 |
| 2005/0021539 A1 * | 1/2005 | Short et al. | 707/100 |
| 2005/0059418 A1 * | 3/2005 | Northcutt | 455/517 |
| 2005/0130641 A1 * | 6/2005 | Lorraine Scott | 455/418 |
| 2006/0068816 A1 * | 3/2006 | Pelaez et al. | 455/466 |
| 2006/0229063 A1 * | 10/2006 | Koch | 455/414.1 |
| 2006/0242210 A1 * | 10/2006 | Ring et al. | 707/204 |
| 2006/0291455 A1 * | 12/2006 | Katz et al. | 370/355 |
| 2007/0074240 A1 * | 3/2007 | Addington et al. | 725/25 |
| 2008/0216139 A1 * | 9/2008 | Liwerant et al. | 725/113 |

* cited by examiner

*Primary Examiner* — Ario Etienne
*Assistant Examiner* — Sargon Nano
(74) *Attorney, Agent, or Firm* — Moazzam & Associates, LLC

(57) ABSTRACT

When a user purchases digital rights to a media file, or otherwise obtains the right to have a copy of the media file downloaded to the user's wireless device, a link to the media file that is stored in the media database is stored in a user storage database. When the user desires to have the media file downloaded to the user's wireless device, the user sends a request to the network. The network performs a check to determine whether the user is authorized to receive the requested media file, and if so, causes the requested media file to be downloaded to the user's wireless device where the media file is stored in the local memory of the wireless device for playback by the user on the wireless device.

20 Claims, 4 Drawing Sheets

SYSTEM, APPARATUS AND METHODS FOR STORING LINKS TO MEDIA FILES IN NETWORK STORAGE

This application is a continuation of U.S. patent application Ser. No. 11/127,385, filed May 12, 2005, now U.S. Pat. No. 7,734,732, the content of which is hereby incorporated by reference herein in its entirety into this disclosure.

BACKGROUND OF THE INVENTION

1. Field of the Invention

The invention relates to wireless technology. More particularly, the invention relates to a system in which links to media files are stored in network storage to obviate the need to store multiple copies of media files in network storage.

2. Description of the Related Art

Third generation (3G) wireless networks provide high-speed data transmission and make it easier for users to download content such as songs, videos, games and graphics. As these networks are launched, one of the constraints on downloading content is device memory capacity. Generally, users have two options when they run low on memory. One option is to copy local files to removable storage media. The other option is to store content at the network level that they can later access to retrieve the content.

As more and more people purchase content that they store in network storage, the network could potentially store multiple copies of the same file, which is a waste of network resources. For example, if 1,000 people store the same music selection in a network provider's media database, the network provider's resources are wasted.

A need exists for a method and apparatus that obviate the need to store multiple copies of the same file in network storage.

SUMMARY OF THE INVENTION

The invention provides an apparatus, a system and a method for storing links to media files in network storage that are used to access media files stored in network storage. The system comprises a user storage database having links to media files stored therein, a media storage database having media files stored therein, authentication logic that determines whether a user is authorized to receive one or more media files, and download logic. The download logic receives a request to send a media file to a wireless device. The request includes a link associated with a media file and an identifier that identifies the wireless device to which the media file is to be sent. The download logic uses the link included in the request to retrieve the media file associated with the link from the media storage database. The download logic sends the retrieved media file to the identified wireless device if the authentication logic determines that a user associated with the identified wireless device is authorized to receive the media file.

The method of the invention comprises storing links to media files in a user storage database, storing media files in a media storage database, receiving a request from a wireless device to download a media file to the wireless device, determining whether or not a user associated with the wireless device is authorized to receive the media file associated with the link included in the request, and if a determination is made that the user is authorized to receive the media file associated with the link included in the request, retrieving the media file associated with the link from the media storage database and sending the retrieved media file to the wireless device.

The apparatus of the invention is a wireless device comprising upload logic for uploading a link to a media file to network storage. The upload logic comprises first logic configured to receive a request to move a media file from local memory of the wireless device to network storage, second logic configured to interpret the request as a request to store a link to the media file in network storage, and third logic configured to cause a request to store the link in network storage to be sent to the network.

The invention also provides a method for uploading a link to a media file from a wireless device to network storage. The method comprises receiving a request in a wireless device to move a media file from local memory of the wireless device to network storage, interpreting the request received in the wireless device as a request to store a link to the media file in network storage, and generating a request in the wireless device to store a link to the media file in network storage.

These and other features and advantages of the invention will become apparent from the following description, drawings and claims.

DETAILED DESCRIPTION OF EXEMPLARY EMBODIMENTS

In accordance with the invention, media files are saved in a media database in a network. Preferably, no more than a single copy of any given media file is stored in the media database, which prevents network resources from being wasted due to storing multiple copies of the same media file. When a user purchases digital rights to a media file, or otherwise obtains the right to have a copy of the media file downloaded to the user's wireless device, a link to the media file that is stored in the media database is stored in a user storage database. When the user desires to have the media file downloaded to the user's wireless device, the user sends a request to the network. The network performs a check to determine whether the user is authorized to receive the requested media file. This may be accomplished by, for example, determining whether a link to the requested file is stored in the user storage database for the user. If a determination is made that the user is authorized to receive the requested media file, the requested media file is sent to the user's wireless device where the media file is stored in the local memory of the wireless device for playback by the user on the wireless device.

Figure 1:
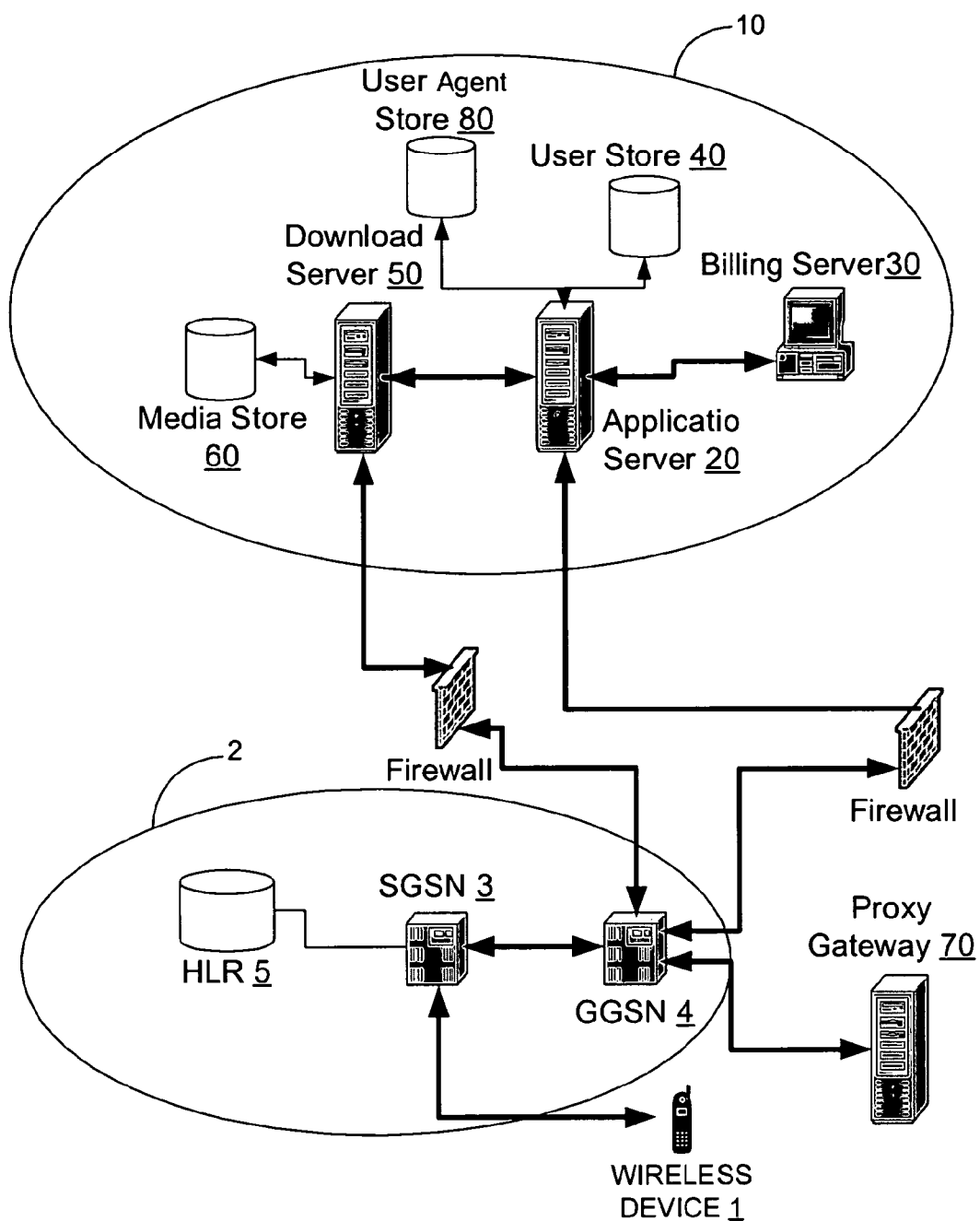
FIG. 1 illustrates a block diagram of the system of the invention for enabling users to store links to files in network storage, which are subsequently used to cause the files associated with the links to be downloaded to the user's mobile device.

FIG. 1 illustrates a block diagram of the system 10 of the invention for storing links to media files that can be subsequently used to cause media files to be downloaded to a user's wireless device 1. The wireless device 1 may be any type of wireless device having the functionality for storing a media file and playing back the media file, such as, for example, a wireless telephone, which typically are not capable of storing a large number of media files (e.g., musical selections) in local memory.

The manner in which the system 10 of the invention operates in accordance with an exemplary embodiment will now be described with reference to FIG. 1. The system 10 may comprise components that are connected to a public network, such as the Internet, for example. Alternatively, the system 10 may comprise components that are connected to a private network. Typically, all of the system components that communicate with each other have Internet Protocol (IP) addresses, regardless of whether they are connected to the Internet or to a private network.

In order to store links to media files in network storage, a user sends a request to store links to the application server 20 via a wireless packet-switched network 2, which is typically a General Packet Radio Services (GPRS) network, but may be any type of packet-switched network. The process of sending the request is performed by a client processor residing on the wireless device 1. A Serving GPRS Support Node (SGSN) 3 performs tunneling and detunneling of Internet Protocol packets and mobility management functions. A Gateway GPRS Support Node (GGSN) 4 detunnels data packets received from the SGSN 3 and routes them to an application server 20 of the system 10. The packets are sent from the wireless device 1, through the GGSN 4 to the application server 20 in a Hypertext Transfer Protocol (HTTP) session using Transmission Control ProtocoVInternet Protocol (TCPIIP). The application server 20 has an IP address to which the GGSN 4 sends the packets.

The wireless device may also include functionality that enables it to access the application server 20 through a proxy gateway 70. This will allow the proxy gateway 70 to add subscriber identification information to the packets (e.g., the Mobile Station Integrated Services Digital Network (MSISDN) number of the wireless device 1). In this case, the wireless device 1 also passes User Agent (UA) header information in the HTTP request that will allow the application server 20 to determine which wireless device the subscriber is currently using. The user agent storage database 80 contains profile information about user devices, which includes information about the capabilities of the devices. The application server 20 uses the UA header information to retrieve profile information from the user agent storage database 80. The application server 20 uses the retrieved profile information to identify the capabilities of the wireless device. Based on the retrieved profile information, logic contained in the download server 50 translates, if necessary, files retrieved from the media storage database 60 into files that the user's wireless device is capable of playing back.

When the application 20 receives the request to store links, the application server 20 performs an authentication algorithm to determine whether the user has a subscription to use the system 10 and/or to determine whether or not the user has purchased the digital rights (e.g., license keys) for the media files associated with the links. The application server 20 may query a billing server 30 for user authentication and paid subscriptions. If the user has not purchased digital rights and/or has not purchased a subscription, the billing server 30 may charge a monetary amount to an account associated with the user.

Once the application server 20 has performed authentication, it stores the links in the user storage database 40 in a location associated with the user. For example, the Mobile Station Integrated Services Digital Network (MSISDN) of the user's wireless device may be translated into an address that is used to access the user storage database 40. Other identifiers may be used for this purpose, such as, for example, the International Mobile Subscriber Identity (IMSI) associated with user's wireless device 1.

The links may be the names of the media files (e.g., the title of a music selection), which would be translated by the download server into addresses in the media storage database. Once the links have been stored in the local storage of the wireless device 1, they are available to be bundled into link storage requests and sent to the application server 20 for storage in the user storage database 40. A link can be anything that can be used to access a file on a network, including a hyperlink, a file name, a database address, etc.

When the user wants to have a media file downloaded to the local storage on the user's wireless device 1, the user sends a download request via wireless network 2 to the download server 50 of system 10. The download request includes the link or links to the media files to be downloaded and a user identifier, such as the MSISDN or IMSI associated with the user's wireless device 1. The download server 50 forwards the download request to the application server 20, which then checks the user storage database 40 to determine whether the links are stored in the location in the user storage database 40 associated with the user. If so, the application server 20 informs the download server 50 that the user has authorization for the requested media file or files. The download server 50 then causes the requested media files to be retrieved from the media storage database 60 and downloaded to the user's wireless device. The SGSN 3 checks the HLR 5 to determine the location of the wireless device 1 so that the files can be downloaded to the user's wireless device 1 even when the wireless device 1 is roaming.

Before the user can send a request to store links to the application server 20, the user first obtains the links. This can be accomplished in a number of ways. One way to do this is to allow the user to search the media storage database 60. In order to perform a search, the user sends a search request to the download server 50 via the wireless network 2. The download server 50 retrieves a list of media files from the media storage database, and sends the list to the user's wireless device 1. The list is then displayed on a display device (not shown) of the wireless device 1. The user is able to peruse the list and make selections using an input device (e.g., a keypad) of the wireless device 1. When the user selects media files, the links associated with the media files are saved in the local memory of the wireless device 1. The locally stored links are subsequently uploaded to the application server 20 to cause the associated media files to be downloaded by the download server 50 to the user's wireless device 1.

Figure 2:
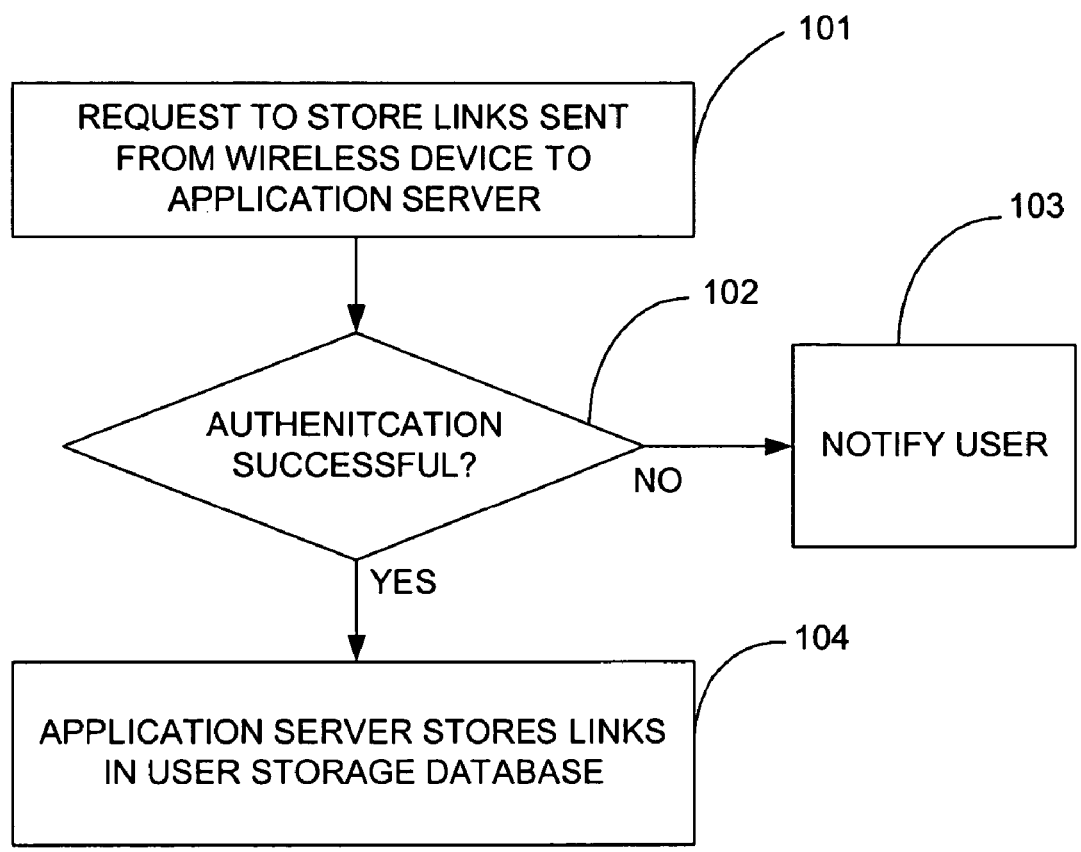
FIG. 2 illustrates a flow chart that represents the method of the invention in accordance with an embodiment for storing links in a user storage database shown in FIG. 1.

FIG. 2 illustrates a flow chart that represents the method of the invention in accordance with an embodiment for storing links in a user storage database 40. The user sends a request to store links to application server 20, as indicated by block 101. The application server 20 performs authentication, as indicated by block 102. If authentication is not successful, the user is notified and may be given an opportunity to pay or authorize payment in order to satisfy authentication requirements, as indicated by block 103. If authentication is successful, the application server 20 stores the links in the user storage database in a location associated with the user or with the user's wireless device, as indicated by block 104.

Figure 3:
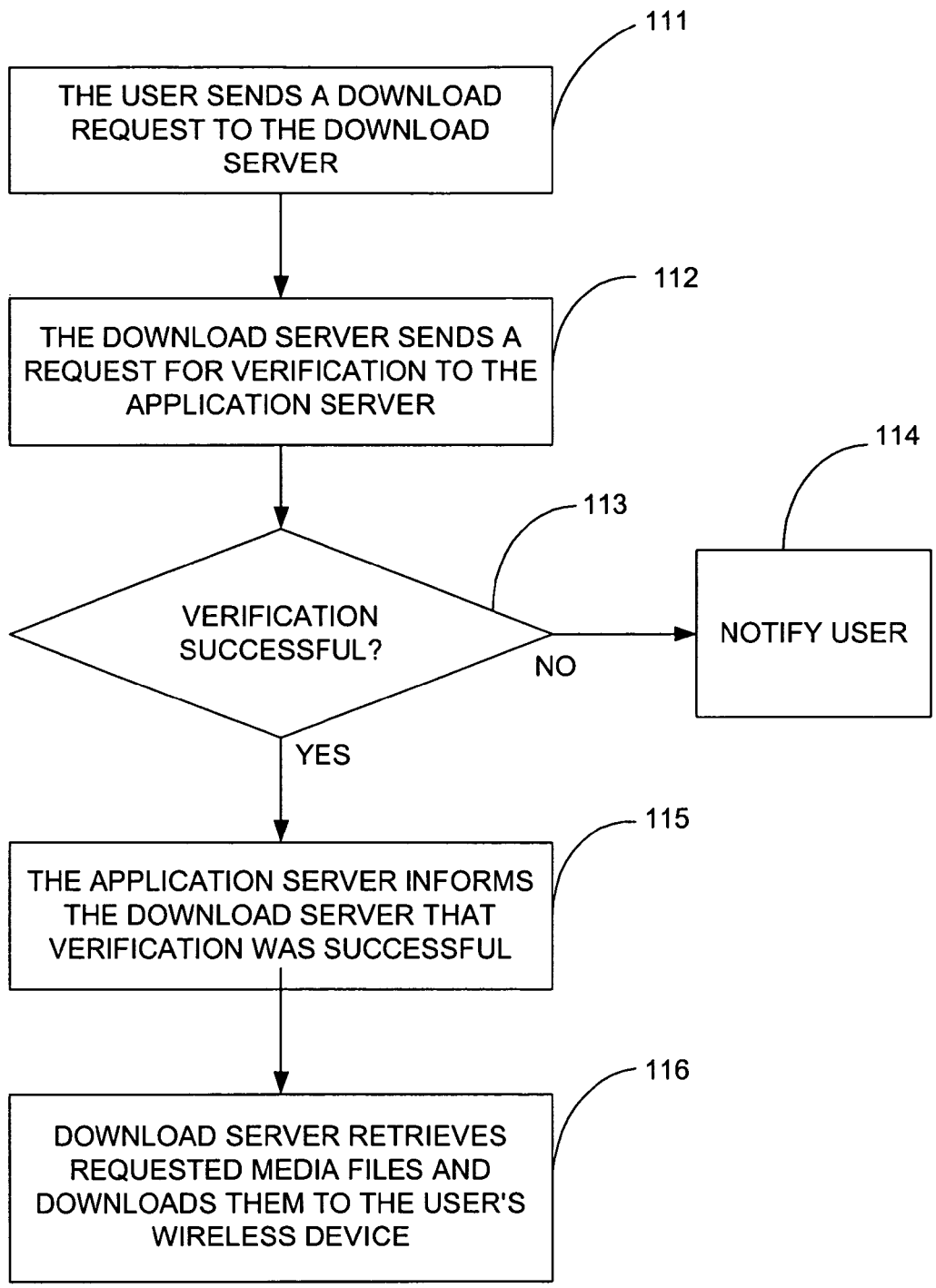
FIG. 3 illustrates a flow chart that represents the method of the invention in accordance with an embodiment for downloading media files from the media storage database shown in FIG. 1.

FIG. 3 illustrates a flow chart that represents the method of the invention in accordance with an embodiment for requesting downloading of media files. The user sends a download request to the download server 50, as indicated by block 111.

The download server 50 sends a request for verification to the application server, as indicated by block 112. The verification request is a request to verify that the user is authorized to have the requested media file or files downloaded to the user's wireless device. The application server 20 checks the user storage database 40 to determine whether links associated with the requested media files are stored in the user storage database 40, as indicated by block 113. If not, a message is sent to the user's wireless device indicating that the user is not authorized to have one or more of the requested media files downloaded, as indicated by block 114. The user may be informed as to how to obtain authorization for the unauthorized media files. If verification is successful, the application server 20 informs the download server 50 that the user has authorization for the requested media files, as indicated by block 115. The download server 50 then retrieves the requested media file or files from the media storage database 60 and downloads them to the local storage of the user's wireless device, as indicated by block 116.

Figure 4:
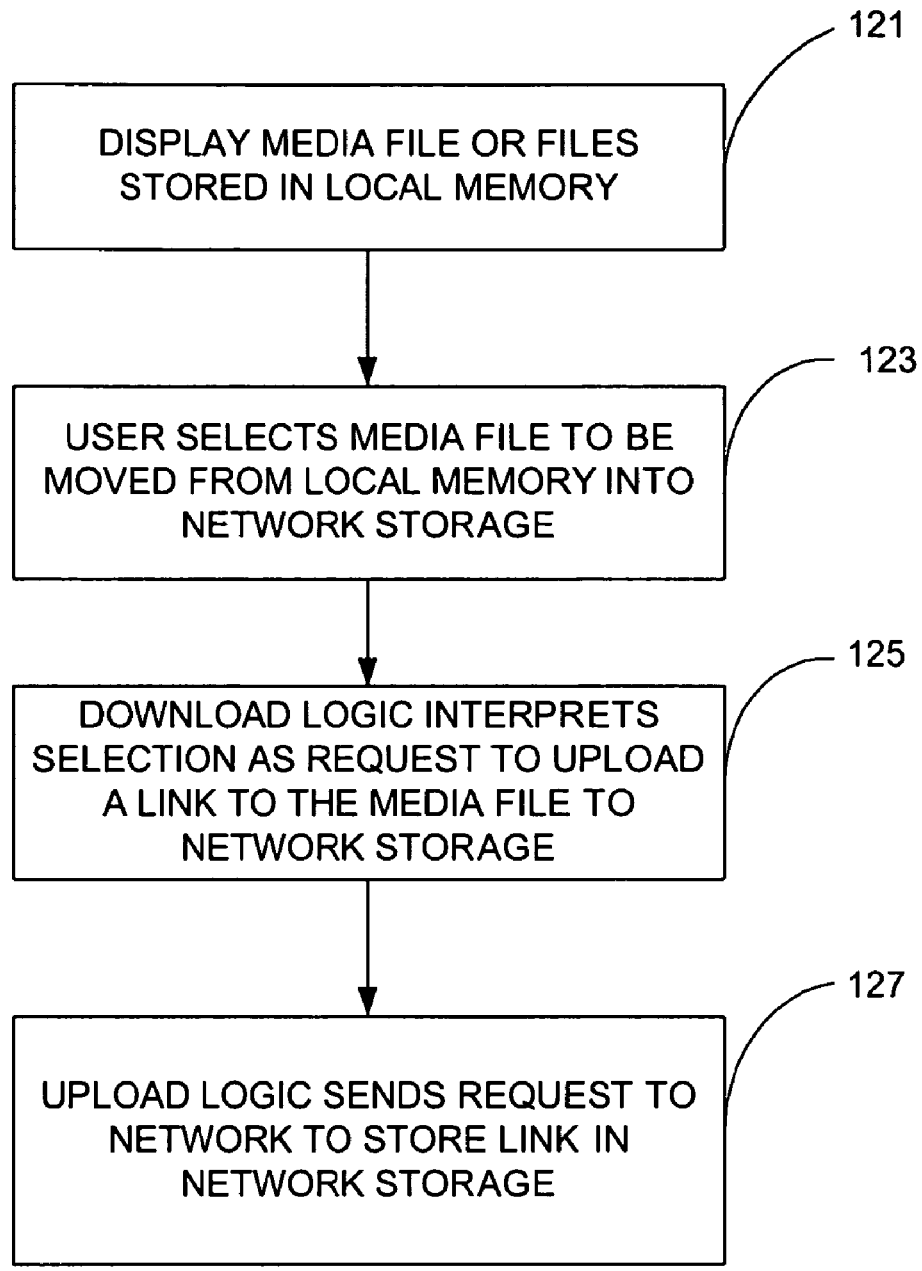
FIG. 4 illustrates a flow chart that represents the method of the invention in accordance with an embodiment for uploading links to media files from the user's wireless device to the user storage database.

In some cases, a user may have already purchased from some source and downloaded the media file to the user's wireless device 1. Because local memory of the wireless device 1 is typically not sufficiently large to store a large number of media files, the user may want to store the media file in network storage and delete it from local memory. FIG. 4 illustrates a block diagram that represent the method of the invention in accordance with an embodiment, for storing a link to the media file, rather than the media file itself, in network storage.

The wireless device 1 in accordance with the invention includes upload logic that processes a user request to move a media file from the local memory of the wireless device 1 into network storage. To accomplish this, the user causes the title of the media file, or some other identifier that identifies the media file, to be displayed on the display device of the wireless device 1, as indicated by block 121. The user then makes an appropriate selection to cause the media file to be moved from local storage to network storage, as indicated by block 123. Steps 121 and 123 will typically be performed by using an input device, such as a keypad, of the wireless device 1 to make appropriate selections. For example, the user may press a button or series of buttons on the keypad to cause all media files stored in local memory to be displayed and another button or series of buttons to select a particular media file or files to be moved from local storage to network storage.

When the user makes a selection to move a media file from local storage to network storage, the upload logic of the wireless device 1 interprets this selection as a request to store a link to the media file in network storage, as indicated by block 125. The upload logic then causes the link to be sent to the application server 20, which stores the link in the user storage database at a location associated with the user, as indicated by block 127. The upload logic preferably also causes the media file to be deleted from the local memory of the wireless device 1, as indicated by block 129.

That the link rather than the media file itself is uploaded to network storage need not be apparent to the user. For example, the user may make a selection that indicates that the media file is being uploaded to network storage, although only the link is actually uploaded. In addition to the steps shown in FIG. 4, the application server 20 may perform authentication or verification process as described above to ensure that the user is a subscriber to the system 10, or is otherwise authorized to use the corresponding media file.

It should be noted that the invention is not limited to the embodiments described above with reference to FIGS. 1-4. Modifications may be made to the embodiments described herein and all such modifications are within the scope of the invention. For example, particular tasks have been described as being performed by particular network elements, e.g., the application server 20 and the download server 50. These tasks may be performed by a single component, e.g., a single server instead of by multiple network components. The invention is not limited to particular tasks being performed by particular network elements. Other modifications may be made to the embodiments described herein and all such modifications are within the scope of the invention.

What is claimed is:

1. A wireless device for storing a link to a media file in a media storage database, the wireless device comprising:
    a client processor;
    a local memory in communication with the client processor; and
    an upload logic on the local memory for
        receiving a user request to move the media file from the local memory to the media storage database, the user request being received from a user of the wireless device,
        responsive to the user request, sending a link to the media file to a user storage database on an application server, and
        deleting the media file from the local memory;
    wherein the media storage database has no more than one copy of each media file.

2. The device of claim 1, further comprising a display device.

3. The device of claim 2, wherein a user agent storage database stores capabilities of the display device.

4. The device of claim 1, further comprising an input device.

5. The device of claim 4, wherein the input device is a keypad.

6. The device of claim 1, wherein the upload logic requests to download a media file to the local memory from the media storage database, the request including a link associated with the media file and an identifier that identifies the wireless device.

7. The device of claim 6, wherein the upload logic receives authorization to receive the media file associated with the link included in the request.

8. The device of claim 7, further comprising retrieving the media file associated with the link from the media storage database to the local memory.

9. A system for storing a link to a media file in network storage, the system comprising:
    a wireless device;
    a download server in communication with the wireless device;
    a media storage database in communication with the download server, the media storage database having a plurality of media files stored therein, the plurality of media files including the media file;
    an application server in communication with the wireless device;
    a user storage database in communication with the application server, the user storage database having a plurality of links to the plurality of media files stored therein;
    an upload logic on the wireless device for
        receiving a user request to move the media file from the local memory to the user storage database, the user request being received from a user of the wireless device,
        responsive to the user request, sending a link to the media file to the user storage database, and deleting the media file from the local memory;

an authentication logic on the application server, the authentication logic for determining whether a user is authorized to receive the media file; and a download logic on the download server, the download logic for:

receiving a request to send the media file to the wireless device, the request including a link associated with the media file and an identifier that identifies the wireless device to which the media file is to be sent, retrieving the media file associated with the link from the media storage database, and sending the retrieved media file to the identified wireless device;

wherein the media storage database has no more than one copy of each media file.

10. The system of claim 9, further comprising a billing server.

11. The system of claim 10, wherein the billing server authenticates the wireless device.

12. The system of claim 10, wherein the billing server associates the wireless device with a paid subscription.

13. The system of claim 9, further comprising a user agent storage database, the user agent storage database including user profiles of wireless devices.

14. The system of claim 13, wherein the user agent storage database includes device capabilities of each wireless device.

15. The system of claim 13, wherein the wireless device includes a display device.

16. The system of claim 15, wherein the user agent storage database includes capabilities of the display device on the wireless device.

17. The system of claim 9, wherein the download logic determines whether or not a user associated with the wireless device is authorized to receive the remote media file associated with the link included in the request.

18. A method for storing a link to a media file in network storage, the method comprising:

receiving a user request to upload a media file from a local memory of a wireless device to network storage, the user request being received from a user of the wireless device;

responsive to the user request, sending the link to the media file to an application server in communication with a user storage database of the network storage; and deleting the media file from the local memory of the wireless device;

wherein the media storage database has no more than one copy of the media file.

19. The method of claim 18, further comprising sending a request from the wireless device to download the media file from the network storage, the request being sent to the application server and including a link associated with the media file from the network storage and an identifier that identifies the wireless device.

20. The method of claim 19, wherein the application server determines whether or not a user associated with the wireless device is authorized to receive the media file associated with the link included in the request.

* * * * *